United States Patent [19]
Galton

[11] Patent Number: 6,128,435
[45] Date of Patent: Oct. 3, 2000

[54] GOOD QUALITY VIDEO FOR THE INTERNET AT VERY LOW BANDWIDTH

[75] Inventor: Brian Neil Galton, Winchester, United Kingdom

[73] Assignee: International Business Machines Corporation, Armonk, N.Y.

[21] Appl. No.: 08/969,516

[22] Filed: Nov. 13, 1997

[30] Foreign Application Priority Data

Jul. 25, 1997 [GB] United Kingdom .................... 9715649

[51] Int. Cl.[7] .................................. H04N 5/917
[52] U.S. Cl. .......................... 386/109; 386/112
[58] Field of Search .............................. 386/52, 109, 111, 386/112, 124, 95, 113, 116, 46, 68, 55, 1, 4, 6, 27, 33, 40, 81; 360/32; H04N 5/917

[56] References Cited

U.S. PATENT DOCUMENTS 5,040,061  8/1991  Yonemitsu ............................. 386/109
5,377,051  12/1994  Lane et al. ............................. 386/68
5,659,654  8/1997  Nagasawa et al. ..................... 386/120

*Primary Examiner*—Robert Chevalier
*Attorney, Agent, or Firm*—Douglas W. Cameron

[57] ABSTRACT

A method for processing digitized video material is disclosed. The method comprises the steps of: capturing (4) a video sequence having a first start-time and a first end-time to provide plurality of digitized frames; filtering (6–13) the frames according to a pre-determined filter function; decimating (6–13) the frames to reduce the frames to a predetermined horizontal and vertical frame size; and encoding (15) the filtered and decimated frames. In response to the encoding step failing to encode the data at a failure time between the first start-time and the first end-time, the video sequence is divided (20) into two or more sequences having a respective start-time and end-time. One of the sequences, having a start-time and an end-time temporally including the failure time, is selected; and the filter function for the selected sequence is re-defined (21). The capturing, filtering, decimating and encoding steps are then repeated for the selected sequence.

17 Claims, 5 Drawing Sheets

| positions | 21 | 22 | 23 | 24 | 25 | 26 | 27 | 28 | 29 | 30 | 31 | |
|---|---|---|---|---|---|---|---|---|---|---|---|---|
| line 61... | y CbCr | y | y CbCr | y | y CbCr | y | y CbCr | y | y CbCr | y | y CbCr | |
| line 62... | y CbCr | y | y CbCr | y | y CbCr | y | y CbCr | y | y CbCr | y | y CbCr | |
| line 63... | y CbCr | y | y CbCr | y | y CbCr | y | y CbCr | y | y CbCr | y | y CbCr | |
| line 64... | y CbCr | y | y CbCr | y | y CbCr | y | y CbCr | y | y CbCr | y | y CbCr | |
| line 65... | y CbCr | y | y CbCr | y | y CbCr | y | y CbCr | y | y CbCr | y | y CbCr | |
| line 66... | y CbCr | y | y CbCr | y | y CbCr | y | y CbCr | y | y CbCr | y | y CbCr | |
| line 67... | y CbCr | y | y CbCr | y | y CbCr | y | y CbCr | y | y CbCr | y | y CbCr | |

FIG.2

112Kbs EXAMPLE scr 10:00:00:00 10:02:00:00 samp s112 3000  5  H 16 112000 1 /mpeg3/dir
scr 10:02:00:00 10:02:30:00 samp s112  750 15  H 16 112000 2 /mpeg3/dir
scr 10:02:30:00 10:04:00:00 samp s112 2250  5  H 16 112000 3 /mpeg3/dir
scr 10:04:00:00 10:05:10:08 samp s112 1758 15  H 16 112000 4 /mpeg3/dir
scr 10:05:10:08 10:05:22:14 samp s112  306  5  H 16 112000 5 /mpeg3/dir
scr 10:05:22:14 10:06:00:00 samp s112  936  5  H 16 112000 6 /mpeg3/dir
scr 10:06:00:00 10:08:00:00 samp s112 3000  5  H 16 112000 7 /mpeg3/dir
scr 10:08:00:00 10:10:00:00 samp s112 3000  5  H 16 112000 8 /mpeg3/dir

FIG.3(a)

288Kbs EXAMPLE scr 10:00:00:00 10:02:00:00 samp s288 3000  5  L 16 288000 1 /mpeg3/dir
scr 10:02:00:00 10:04:00:00 samp s288 3000  5  L 16 288000 2 /mpeg3/dir
scr 10:04:00:00 10:06:00:00 samp s288 3000  5  L 16 288000 3 /mpeg3/dir
scr 10:06:00:00 10:08:00:00 samp s288 3000  5  L 16 288000 4 /mpeg3/dir
scr 10:08:00:00 10:10:00:00 samp s288 3000  5  L 16 288000 5 /mpeg3/dir

FIG.3(b)

scr 10:00:00:00 10:02:00:00 samp s112 3000  5 H 16 112000 1 /mpeg3/dir
scr 10:02:00:00 10:04:00:00 samp s112 3000  5 H 16 112000 2 /mpeg3/dir
scr 10:04:00:00 10:06:00:00 samp s112 3000  5 H 16 112000 3 /mpeg3/dir

FIG.4(a)

scr 10:00:00:00 10:02:00:00 samp s112 3000  5 H 16 112000 1 /mpeg3/dir
scr 10:02:00:00 10:02:08:00 samp s112  200  5 H 16 112000 2 /mpeg3/dir
scr 10:02:08:00 10:02:12:00 samp s112  100 15 H 16 112000 3 /mpeg3/dir
scr 10:02:12:00 10:04:00:00 samp s112 2700  5 H 16 112000 4 /mpeg3/dir
scr 10:04:00:00 10:06:00:00 samp s112 3000  5 H 16 112000 5 /mpeg3/dir

FIG.4(b)

GOOD QUALITY VIDEO FOR THE INTERNET AT VERY LOW BANDWIDTH

FIELD OF THE INVENTION

The present invention relates to a method for processing digitised video material.

BACKGROUND

The International Standards ISO/IEC 11172-1 (Systems), ISO/IEC 11172-2 (Video) and ISO/IEC 11172-3 (Audio) describe the coding of moving pictures and associated audio for digital storage media. This set of standards is more commonly known as MPEG-1 (Moving Pictures Expert Group).

MPEG defines the format of a compressed data stream and proposes ways in which it can be decoded (decompressed and played back). However, there are no constraints on how streams are produced so that encoders are free to implement their own algorithms to gain a competitive edge.

The widespread use of video material on the Internet is constrained by low speed communication channels and the limited space available on user PCs and Web page servers. Compression of digitised video reduces the volume of data dramatically but resulting file sizes are still prohibitive (for the Internet environment). The available solutions either produce large files, or compromise the quality of video and/or audio, or reduce the picture rate to achieve their goals.

There is therefore a requirement for a method which produces good quality, synchronised video and audio which can be played back using commercially available software decoders at 25 frames per second (fps) i.e. like watching small-screen TV—but all at very low bandwidth.

DISCLOSURE OF THE INVENTION

Accordingly, the present invention provides a method for processing digitised video material comprising the steps of:
a. capturing a video sequence having a first start-time and a first end-time to provide plurality of digitized frames;
b. filtering said frames according to a pre-determined filter function;
c. decimating said frames to reduce said frames to a pre-determined horizontal and vertical frame size;
d. encoding said filtered and decimated frames;
e. in response to said encoding step failing to encode said data at a failure time between said first start-time and said first end-time, re-defining said filter function for a selected sub-sequence of said sequence, said sub-sequence temporally including said failure time; and
f. repeating said previous steps a. to d. for said selected sub-sequence.

In a second aspect, the invention provides a method for processing digitised video material comprising the steps of: capturing a video sequence having a first start-time and a first end-time to provide plurality of digitized frames; filtering said frames according to a pre-determined filter function; decimating said frames to reduce said frames to a pre-determined horizontal and vertical frame size; encoding said filtered and decimated frames with an MPEG encoder of the type employing a Video Buffer Verifier (VBV) to produce an encoded video sequence having a bit rate of between 112 Kbs and 288 Kbs, said VBV being set at approximately 16 K.

The invention further provides an encoded video sequence processed according to either method of the invention.

The invention in a further aspect provides a computer program product comprising computer program code stored on a computer readable recording medium, the computer program code including a digitised video material processing tool for use in the creation of an encoded video sequence, the tool including: means adapted to capture a video sequence having a first start-time and a first end-time to provide plurality of digitized frames; means adapted to filter said frames according to a pre-determined filter function; means adapted to decimate said frames to reduce said frames to a pre-determined horizontal and vertical frame size; means adapted to encode said filtered and decimated frames; means adapted to re-define said filter function for a selected sub-sequence of said sequence, in response to said encoding means failing to encode said data at a failure time between said first start-time and said first end-time, said sub-sequence temporally including said failure time.

BRIEF DESCRIPTION OF THE DRAWINGS

FIG. 2 shows a sub-set of captured lines from a digitised video source;

FIGS. 3(a) & 3(b) are sample script files including calls to a script file for processing digitised video material;

FIGS. 4(a) & 4(b) are sample script files adjusted to compensate for a failure in an MPEG encoder.

DESCRIPTION OF THE PREFERRED EMBODIMENT

Figure 1A:
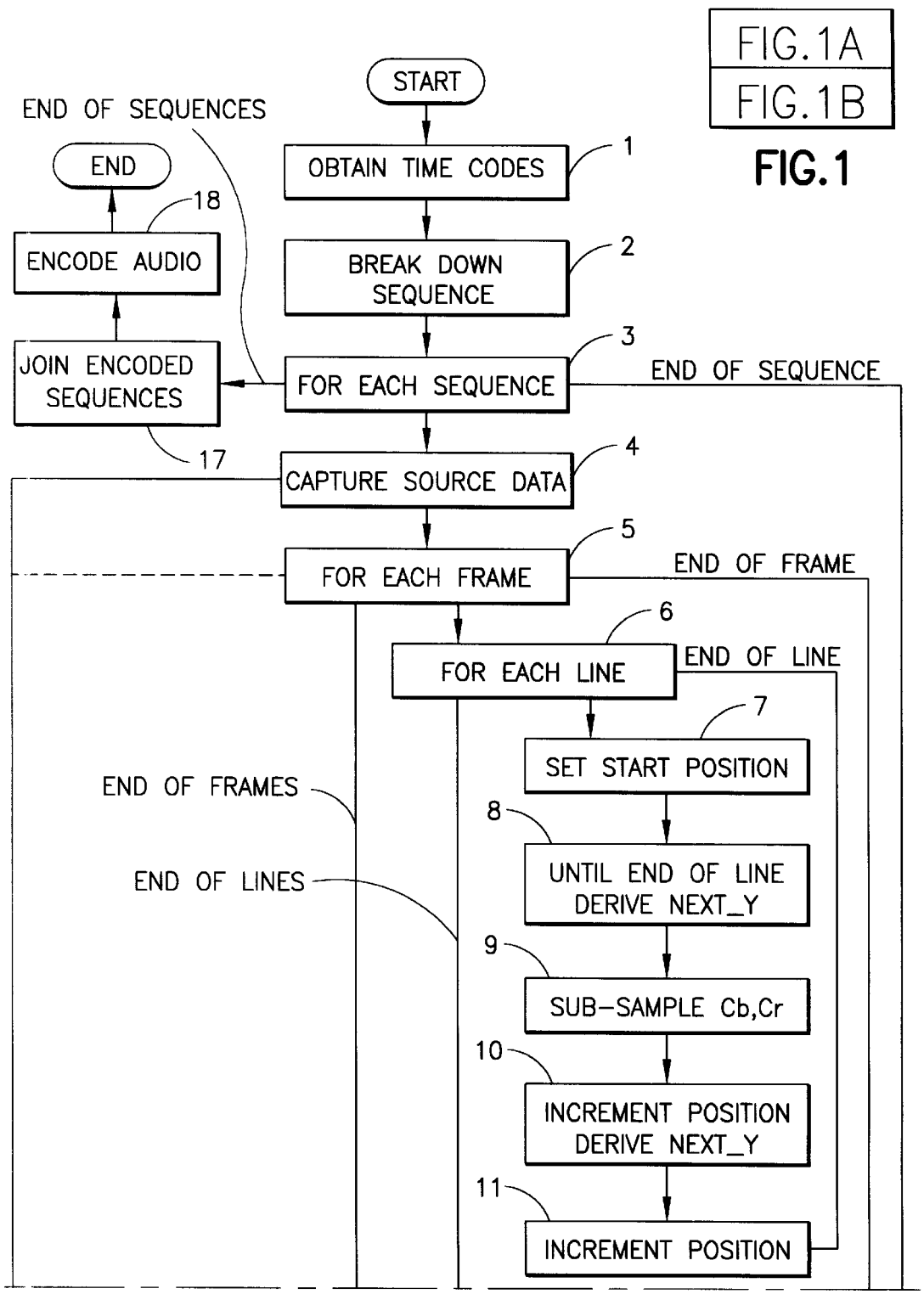
FIG. 1 is a flow diagram illustrating a method according to the invention for processing digitised video material.

The present embodiment employs a conventional computer in communication with a digital video tape recorder (VTR), for example, a Sony DVTR DVW-A500P. The VTR plays tapes which include a time stamp and, in response to a request by the computer specifying a start-time and end-time, a capture program causes the VTR to dump a digitised source video sequence to a digitised data file on a storage medium, such as, a hard disk, associated with the computer.

A further filter program smooths and decimates the data, which is subsequently fed to an encoder program to generate an MPEG sequence.

The encoder program is of a conventional MPEG encoder type. It is controlled by parameters specifying, inter alia, the bit rate of the MPEG sequence to be generated by the encoder. In the present embodiment, the encoder is instructed to produce a sequence whose playback will not require in excess of a specified bit rate, i.e. 112 Kbs or 288 kbs at a frame rate of 25 frames per second.

As is known in the art, MPEG exploits a strong temporal correlation of video signals and achieves compression by using predictive and interpretive techniques which reduce redundancy and produce a prediction error. A Discrete Cosine Transformation (DCT) technique is applied to the resulting prediction error information to produce sets of 8×8 transformation matrices containing frequency energy coefficients. Most the energy is concentrated in low frequency values which are conventionally written in the upper left-hand corner of the transformed matrices. The coefficients are quantised to reduce their magnitude and to increase the number of zero values. Quantization is a lossy step and is used by the encoder to match its output to a given bit rate.

The quantization results are scanned in a zig-zag order to place the maximum number of zero value coefficients at the end of the scan. This facilitates subsequent use of run-length encoding techniques which produce further compression.

If the encoder cannot produce an MPEG sequence to the required bit rate given a maximum allowed degree of lossiness, the encoder will stop and return a failure flag with a time during the sequence at which the encoder failed. Such failures can occur during scenes having a great degree of movement and detail, for example, a sports scene where the camera zooms in and out from an audience.

The present embodiment employs an optimum combination of parameters to achieve target MPEG file sizes of either 1 MB or 2.4 MB per minute of source material, depending upon level of quality required. These parameters include: picture size; video bit rate; audio bit rate and mode; width of filter (no. of taps); softness of filter (degree of contribution from neighbouring samples); size of Video Buffer Verifier (VBV); and levels of luminance and chrominance at source.

Picture Size

Small picture sizes are useful since there is much less information to compress and this helps to keep the quality reasonable as the bit rate drops; a typical MPEG picture size of 352×288 would exhibit far too many artifacts to be useable at very low bit rates.

The picture size does not affect the file size of the compressed video—this depends solely on the bit rate—but since smaller pictures allow use of low bit rates, they make the generation of small files possible.

The optimum picture size is one that is mathematically 'convenient', large enough to give a presentable picture, yet small enough to preserve encoding quality.

In the present embodiment, an interlaced video source is used. The source supplies 25 frames per second each including 2 source fields. Each frame of the video source contains a total of 625 lines including 49 vertical blanking lines, (24 and 25 per field respectively). The capture program does not request the blanking lines to leave 576 lines, 288 lines per field.

In the present embodiment, the filter program initially prunes the initial video source horizontal dimension of 720 to 704 samples to remove unwanted black samples and give a dimension divisible by 16 to facilitate MPEG algorithms.

The filter program then carries out a 4:1 data decimation, or reduction, to reduce the initially filtered image of 704× 576 samples to produce a picture size of 176×144—a size that meets the criteria for achieving good quality pictures at a size acceptable to a viewer.

Data Reduction

The manner in which the data reduction is achieved has a significant effect on the final quality—simply taking every nth sample from the digitised source material both horizontally and vertically will work, but superior results are obtained from the use of weighted filtering.

The data reduction is achieved by selectively applying filters to the input data which in the present embodiment is supplied in interlaced 4:2:2 luminance/chrominance format. Luminance (Y) data are reduced using multi-tap filters whereby neighbouring Y samples contribute to a new Y value using a set of weighted filter coefficients. Chrominance (Cb,Cr) data, however, are reduced by simple sub-sampling.

In the embodiment, the Y values are filtered horizontally and vertically using a variable number of taps. Horizontally, a choice of 5, 7, 9, 11 or 15 tap filters can be selectively employed; although only 5 or 15 taps are employed in the present embodiment. Vertically, a 5 or 7 tap filter can be employed. The number of taps and the softness of the filter can be specified for individual video sequences, which are seamlessly joined after the encoding program executes. In a preferred embodiment, 5 tap filters are used initially to produce the best subjective quality.

Video Bit Rate

It will be seen that the lower the selected video bit rate, the more difficult it is to achieve successful compression.

If the rate is too low, success becomes so heavily dependent on the nature of the source material that its use is prohibitive. The lowest bit rate for general, practical use is preferably 112 Kbs; this is equivalent to roughly 1800:1 compression and the results are surprisingly good. A bit rate of 288 Kbs gives very good quality results. Of course, rates between these values can also be used in accordance with the invention.

Video Buffer Verifier

An MPEG-1 encoder uses a device called a Video Buffer Verifier (VBV) to ensure constant bit rate coding and smooth playback. A buffer size for the bit rate needs to be specified.

It is necessary to select the size of the video buffer to maintain quality and enable decoders to playback smoothly. A VBV size of 40 K bytes is usual, but if this size VBV is used at the very lowest rates of 112 Kbs, decoders are unable to playback the material (black pictures appear until a steady, unchanging sequence of material is encountered).

In the present embodiment, an optimum VBV size for low video bit rates is chosen to be 16 K. It is noticeable that picture quality (at very low rates) degrades as the VBV buffer gets progressively larger (ultimately until no picture appears, as mentioned above). Use of the wrong buffer size can also cause slight picture 'stutter'—it often manifests itself at the start of playback.

A VBV size of 18 K although not optimal will work if use of 16 K fails, however, the resulting quality is not always as good.

VTR Settings

If a section of video repeatedly fails to encode, then a reduction in source picture luminance and optionally chrominance can help to overcome this encoding failure. This can be done by adjustments to the VTR video control or black level control, with the effects monitored using a vectorscope. Colour-bars are useful a reference material for doing this. By noting the new video signal levels on the vectorscope, it means that a process can be easily reproduced or consistently applied to other sequences.

In the present embodiment, the reduction is only applied to the section of failing video, not the whole video.

Audio

Although the MPEG-1 specification allows a 'free format' audio bit rate, the lowest practical bit rate for all layers is 32 Kbs. Not all audio modes are allowed for all bit rates and attempts to violate this can cause a decoder to hang. Only single channel (mono) audio is permitted for 32 Kbs and the lowest bit rate for stereo audio is 64 Kbs.

Even if it were possible to use rates lower than 32 Kbs, it is likely that most audio decoders will only tolerate 32 Kbs or above. Use of the 32 Kbs rate means that the audio stream occupies over a third of the total bandwidth (and more, if it is stereo), which is frustrating since it would be extremely useful to be able to allocate more bandwidth to the video and less to the audio.

Ideally, candidate material to be encoded according to the method of the invention for low bit rate (112 Kbs) encoding should employ mono audio tracks so that the 32 Kbs audio rate can be used.

Figure 1B:
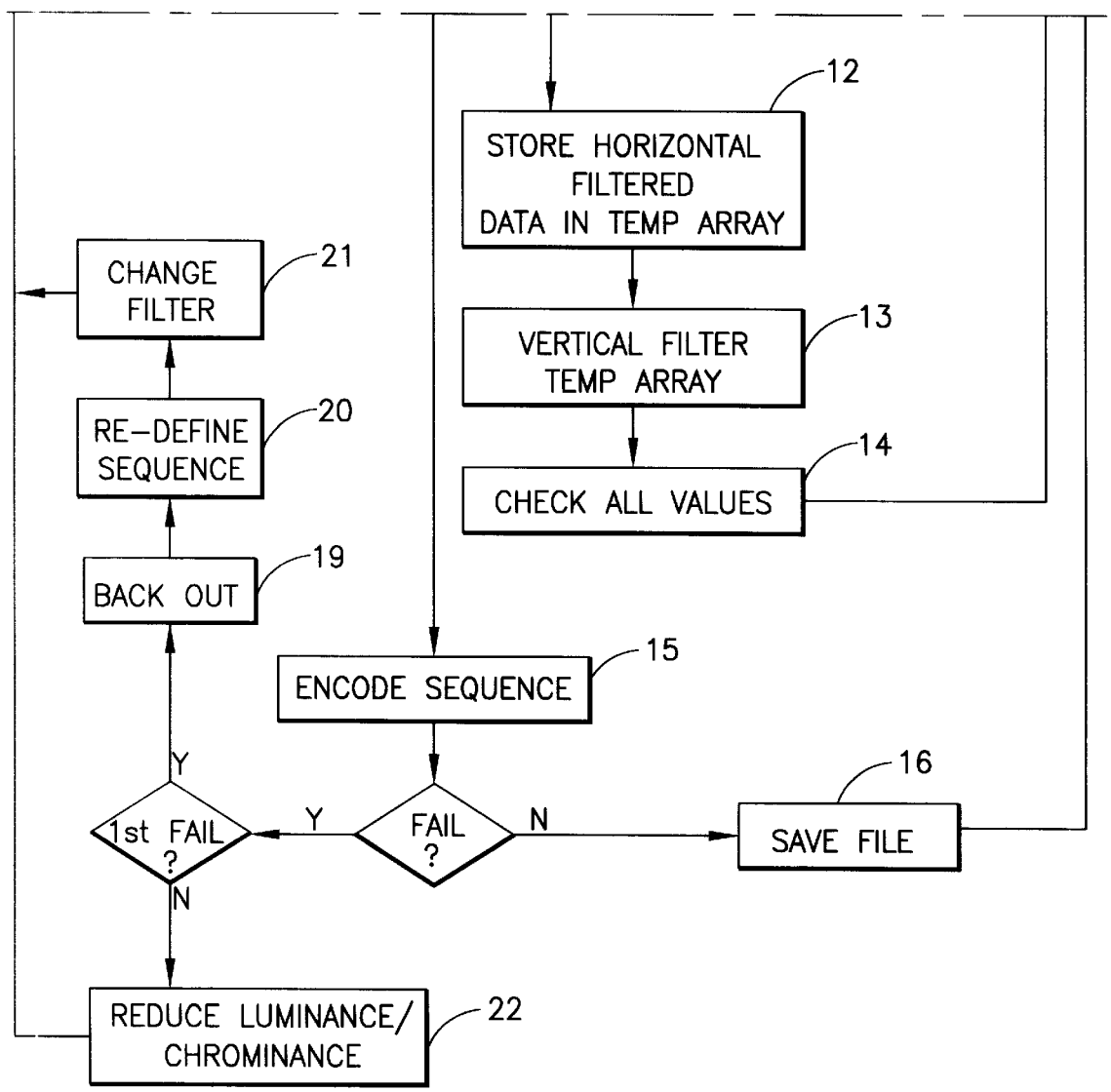

The method of the present embodiment is described in detail below. The method includes the following steps, illustrated in FIG. 1:

1. obtain from the user the time-codes of the start and end time of the video sequence to be compressed.
2. break the job down into a number of smaller video sequences by specifying respective start-times and endtimes, typically 2 or 3 minutes apart. This facilitates recovery in the event of an error particularly where long sequences are specified by the user. This also economises on disk space because only one video sequence needs to be stored at any given time. Thus, a single file can be overwritten with the current video sequence being processed.
3. for each video sequence—do steps 4 to 16
4. capture digitised video source data from its start-time to end-time, in interlaced format, as luminance (Y) and chrominance (Cb, Cr) samples
   a. within each frame, each line of captured input consists of a stream of Y, Cb and Cr values ordered as shown below:

... Cb Y Cr Y Cb Y Cr Y Cb Y Cr Y Cb Y Cr Y Cb Y Cr ...

b. in the horizontal direction, two chrominance values are co-sited with a luminance value at every other position in a line, so there are half as many of each type of chrominance sample as there are luminance samples
   c. for each video sequence, the byte size of the captured data is:

(720*Y+360*Cb+360*Cr)*576*(no. of frames captured)

a. each frame of data contains 576 lines since there are 288 lines in each (PAL) video field and the data are interlaced;
   b. as explained above, vertical blanking lines are not captured and neither of the two source fields are discarded so that the maximum possible amount of source data is used for subsequent steps
   c. FIG. 2 shows a sub-set of the captured lines in their logical format which shows how Y, Cb and Cr samples are co-sited
5. for each frame in the video sequence—do steps 6 to 14
6. for each line in the frame, unless otherwise specified, use a 5 tap filter and reduce the number of Y values horizontally by a factor of 4:1. If the video bit rate is 112 kbs, use the following soft filter coefficients, ($f(1) \ldots f(5)$):

(3723, 7813, 9696, 7813, 3723)

if the rate is 288 Kbs, use the following harder coefficients:

(2720, 8125, 11078, 8125, 2720)

In both cases, the sum of the filter coefficients is 32768 ($2^{15}$); this is used as the divisor, to get the new filter Y value
7. beginning at starting position Y(a), where a is determined according to the width of the filter being used. It will be seen that for some starting positions very wide filter may cross over the bounds of the frame and appropriate adjustments may need to be made to any filtering calculations
8. continuing until the end of a line, derive a next Y as follows:

$$\text{sum} = Y(n-2)*f(1) + Y(n-1)*f(2) + Y(n)*f(3) + Y(n+1)*f(4) + Y(n+2)*f(5)$$

$$\text{next\_Y} = \text{sum}/32768$$

9. sub-sample Cb and Cr from the same site that is occupied by the central Y(n) in the luminance filtering calculation
10. increment n by 4 and derive the next Y as in step 8. This time, do not sub-sample the chrominance since the horizontal 2:1 ratio of Y to Cb and Cr values has to be maintained
11. increment n by 4 and return to step 8
12. store the results of horizontal filtering and sampling in a temporary array, which will contain 176*Y, 88*Cb and 88*Cr samples for each of 576 lines
12. store the results of horizontal filtering and sampling in a temporary array, which will contain 176*Y, 88*Cb and 88*Cr samples for each of 576 lines
13. using the same filter $f(1) \ldots f(5)$, unless otherwise specified, and the processing steps 7 to 11, mutatis mutandi, reduce the size of the data in the temporary array by a factor of 4 in the vertical dimension to create a final array of new values; this new array will contain 144 lines, each of which has 176*Y, 88*Cb and 88*Cr samples (note: some encoders may require extra vertical chrominance data reduction)
14. check all new Y, Cb and Cr values for conformance to the CCIR 601 standard; the valid range for Y is 16 to 235; for Cb and Cr it is 16 to 240; if any values lie outside these ranges, assign the minimum or maximum valid value instead (whichever is appropriate)
15. input the captured and filtered data for each video sequence to the MPEG-1 video encoder; specify a video bit rate from one of 112 Kbs or 288 Kbs and a VBV size of 16 K (other encoder parameters, as normal)
16. if video encoding is successful, save the resulting compressed files (and any temporary files that the encoder may rely on for future steps) with unique filenames to facilitate recovery in the event of failure. In the present embodiment, filenames are identified by appending a step number, FIGS. 3(a) & 3(b).
17. join the results of the encoded video sections
18. encode the audio for the whole video by whatever means are normally used, specifying an audio bit rate of 32 Kbs and mono mode—assuming source tape has been produced with mono audio; if not, specify 64 Kbs and stereo mode. Multiplex the video and audio streams Error Recovery Video material is extremely variable both in content and quality. The lower the bit rate, the greater the likelihood of encoder failure when dealing with 'difficult' material, as explained above. Using 288 Kbs, failure is very unlikely; with 112 Kbs failures are more common.

In the event of failure, do the following:
19. if the encoder fails, 'back out' the most recently encoded video to the last 'good point' (this highlights the advantage of breaking the user specified sequence into smaller sequences and saving the encoded results of each step)
20. redefine the video sequence according to where the failure occurred. There are many possible schemes for re-defining the video sequence, as explained below.
21. in the event of a first failure, change the filter used in the re-defined video sequence containing the failure. The changed filter is used for both the 112 Kbs and 288 Kbs and includes 15 taps, for use in the horizontal direction, defined as follows:

(512,768,1024,1788,2048,2816,4482,5892, 4482,2816, 2048,1788,1024,768,512)

and 7 taps, for use in the vertical direction, defined as follows:

(1062, 3836, 7152, 8668, 7152, 3836, 1062)

and re-execute from step 4 above
22. if a subsequent failure recurs at the same point, change the VTR video control, such that when colour-bars are shown, the highest luminance and optionally chrominance level is reduced, preferably by 5%; and re-execute from step 4 above. If further failures occur, iteratively reduce the luminance and optionally chrominance level by a further 5% (still using the 15/7 tap filter) until encoding is successful (the VTR control must be reset to its normal position for subsequent steps).

The reduction in luminance and optionally chrominance can be implemented either by a program prompting the user to manually reduce the settings on the VTR before the program proceeds to re-process the sequence; or in a VTR suitably equipped, it may be possible for the computer to communicate the required reduction directly to the VTR. Alternatively, and more efficiently, the first formula of step 8 can be adjusted to:

$$\text{sum} = w^*(Y(n-2)^*f(1) + Y(n-1)^*f(2) + Y(n)^*f(3) + Y(n+1)^*f(4) + Y(n+2)^*f(5))$$

where w is a weighting factor for reducing the luminance values. Initially w is set to "1", but is reduced in steps of 0.05, or any other selected value, after the encoding step fails more than once. The same weighting factor w can further be used to reduce the value of the sampled chrominance Cb,Cr samples if required. This eliminates the need to re-capture a video sequence and allows program control to return to step 5, rather than step 4, after step 22.

Redefining a Video Sequence

In the example of FIG. 4(a), failure occurred in a video sequence initially specified to begin at 10:02:00:00 and to last until 10:04:00:00. The job is re-defined as shown in FIG. 4(b), where the sequence is split into first, second and third sequential subsequences. The second sub-sequence is of a pre-determined length, preferably only a number of seconds, in the present case 4 seconds, centred around the point of failure. This is because it is usually short scenes which cause the encoder to fail, and by only smoothing the filter for the short second sub-sequence, the longer first and third sub-sequences remain unaffected and the reduction in quality is relatively imperceptible to a viewer.

It will be seen that, although in the present embodiment the smoothened filter is applied to a sub-sequence lasting 4 seconds, the program could be made more intelligent to pick out the start of a scene causing trouble for the encoder. The smoothened filter could then be used only on this scene, rather than crossing scene boundaries as may be the case when centering the selected sub-sequence around the point of failure.

It will be seen that re-capturing the digitised data for the re-defined sub-sequences from the VTR facilitates easier programming. The re-capturing step may only require re-reading the file originally dumped onto the computer hard disk by the VTR as explained above. This can be divided into three files, each containing a respective sub-sequence, and processed separately; or the controlling program can determine to which portion of the digitised data the re-defined filter is to be applied and re-process the three sub-sequences from one file. In any case, the capturing and re-capturing steps are only required to produce pre-filtered digitized data for processing.

As an alternative to dividing the sequence into three sub-sequences, and in particular if shorter initial video sequences are used, a failing video sequence could be divided into first and second sub-sequences; the point of failure, being in either one of the sub-sequences. The sub-sequence containing the point of failure could then be processed with the softer filter with the other subsequence being unaffected.

It will also be seen that while in the present embodiment, the filter is softened from a 5 tap to a 15/7 tap filter, the step 21 of re-defining the filter, may also be performed iteratively, to determine the "least soft" filter which will encode the video sequence successfully.

Sample Execution

There are clearly many ways in which the method according to the invention could be implemented and they depend upon the operating system, hardware platform, how data are stored, type of encoder etc.

The present embodiment is implemented in an AIX environment. In the embodiment, a master script file is generated to define all the parameters needed to process each video sequence; another script file, called 'scr', launches the capture, filter and encoding programs required to carry out the method.

FIGS. 3(a) and 3(b), are samples from the master script files. In these examples, 10 minutes of source material are processed, first using 112 Kbs, FIG. 3(a), and then 288 Kbs, FIG. 3(b).

The script file, scr, receives the following parameters: time-code in; time-code out; input filename (without path); output filename (without path); no. of frames; filter width; filter softness; VBV size; video bit rate; step number (for recovery); directory name.

In general, the operation of the 'scr' script file is as follows:

exec initialisation (file cleanup to delete unwanted files)
exec capture_program (name of input file,
    time_in,
    time—out,
    data format specification)
exec filter_program (name of input file,
    specifications of filter)
exec video_encoder (name of input file,
    name of output file,
    video bit rate,
    size of VBV,
    . . . )
exec save_files (to facilitate recovery)

It will be noted that while PAL picture dimensions and frame rate are used in the above description, the invention is not restricted to PAL—it could be used for other standards like NTSC.

The invention provides good quality video and audio with accurate lip sync, very small file sizes—as low as 1 MB (byte) per minute of source material, playback at a picture rate of 25 fps using commercially available hardware or software decoders e.g. Sigma Design's ReelMagic (hardware) or Microsoft's ActiveMovie (software) products and compliance with the MPEG-1 international standard.

The invention provides a solution for the following sample applications:

a. the distribution of video over the Internet and Intranets b. storage on Web pages of, inter alia, film trailers; samples; previews; adverts; news clips; highlights;

c. provision of online archives;

d. as an economical means of selling TV programmes (to prospective buyers);

e. the archiving of huge amounts of video material on a single CD or on media servers f. on-site video instruction g. multimedia

What is claimed is:

1. A method for processing digitized video material comprising the steps of:
   a. capturing a video sequence having a first start-time and a first end-time to provide plurality of digitized frames;
   b. filtering said frames according to a pre-determined filter function;
   c. decimating said frames to reduce said frames to a pre-determined horizontal and vertical frame size;
   d. encoding said filtered and decimated frames;
   e. in response to said encoding step failing to encode said data at a failure time between said first start-time and said first end-time, re-defining said filter function for a selected sub-sequence of said sequence, said sub-sequence temporally including said failure time; and
   f. repeating said previous steps a. to d. for said selected sub-sequence.

2. A method as claimed in claim 1 wherein said re-defining step comprises dividing said video sequence into two or more sub-sequences each having a respective start-time and end-time; a selected one of said sub-sequences having a start-time and an end-time temporally including said failure time.

3. A method according to claim 1 wherein said encoding step is performed by an MPEG encoder.

4. A method according to claim 3 wherein said encoder is adapted to encode said data at a pre-determined bit rate and pre-determined quality level, and said encoding step fails if said encoder cannot encode said data at or below said bit rate and at or above said quality level.

5. A method according to claim 1 where, in response to said encoding step failing to encode said data at a failure time between said first start-time and said first end-time, said video sequence is divided into first, second and third sub-sequences each having a respective start-time and end-time, and said second sub-sequence is selected to have a start-time and an end-time temporally including said failure time.

6. A method according to claim 5 where said second sub-sequence is approximately 4 seconds long.

7. A method according to claim 1 wherein said video sequence is captured from a digital video tape recorder.

8. A method according to claim 7 where, in response to said encoding step failing to encode filtered and decimated data for said selected sub-sequence, the method includes the steps of:
   g. reducing the luminance of said selected sub-sequence; and
   h. repeating said previous steps b. to d. for said selected sub-sequence.

9. A method according to claim 8 wherein said steps g. and h. are performed iteratively in response to said encoding step further failing to encode filtered and decimated data for said selected sub-sequence.

10. A method according to claim 8 wherein said luminance is reduced by 5%.

11. A method according to claim 7 where said video sequence is one of a plurality of video sequences captured from a program stored on a tape loaded into said video tape recorder.

12. A method according to claim 1 where said video sequence is approximately 2 minutes long.

13. A method according to claim 1 in which said re-defined filter function is softer than said pre-determined filter function.

14. A method for processing digitised video material comprising the steps of:
   a. capturing a video sequence having a first start-time and a first end-time to provide plurality of digitized frames;
   b. filtering said frames according to a pre-determined filter function;
   c. decimating said frames to reduce said frames to a pre-determined horizontal and vertical frame size;
   d. encoding said filtered and decimated frames with an MPEG encoder of the type employing a Video Buffer Verifier (VBV) to produce an encoded video sequence having a bit rate of between 112 Kbs and 288 Kbs, said VBV being set at approximately 16 K.

15. A method according to claim 1 where said frames are decimated to a horizontal and vertical frame size of 176×144 samples respectively.

16. An encoded video sequence processed according to the method of claim 1.

17. A computer program product comprising computer program code stored on a computer readable recording medium, the computer program code including a digitised video material processing tool for use in the creation of an encoded video sequence, the tool including: means adapted to capture a video sequence having a first start-time and a first end-time to provide plurality of digitized frames; means adapted to filter said frames according to a pre-determined filter function; means adapted to decimate said frames to reduce said frames to a pre-determined horizontal and vertical frame size; means adapted to encode said filtered and decimated frames; means adapted to re-define said filter function for a selected sub-sequence of said sequence, in response to said encoding means failing to encode said data at a failure time between said first start-time and said first end-time, said sub-sequence temporally including said failure time.

* * * * *